US008131259B2

(12) United States Patent
Haynes et al.

(10) Patent No.: US 8,131,259 B2
(45) Date of Patent: Mar. 6, 2012

(54) METHODS, SYSTEMS, AND APPARATUS FOR HANDLING SECURE-VOICE-COMMUNICATION SESSIONS

(75) Inventors: Thomas W. Haynes, San Ramon, CA (US); Steven R. Rados, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 545 days.

(21) Appl. No.: 12/347,768

(22) Filed: Dec. 31, 2008

(65) Prior Publication Data

US 2010/0167692 A1    Jul. 1, 2010

(51) Int. Cl.
*H04M 1/66* (2006.01)
(52) U.S. Cl. ........................................ 455/410; 455/411
(58) Field of Classification Search .................. 455/403, 455/410, 411, 412.2, 414.1, 456.6, 517, 560, 455/95
See application file for complete search history.

(56) References Cited

U.S. PATENT DOCUMENTS

| 7,149,521 | B2 * | 12/2006 | Sundar et al. ............... 455/435.1 |
| 7,218,619 | B2 * | 5/2007 | Koo et al. ...................... 370/329 |
| 2007/0156966 | A1 * | 7/2007 | Sundarrajan et al. ......... 711/133 |
| 2007/0242672 | A1 * | 10/2007 | Grayson et al. ............... 370/392 |
| 2008/0096506 | A1 * | 4/2008 | Nguyen et al. ............. 455/187.1 |
| 2008/0299954 | A1 * | 12/2008 | Wright et al. ............... 455/414.1 |

OTHER PUBLICATIONS

KOOLSPAN, KoolSpan Voice Solution, 2 pages, http://www.koolspan.com/enterprise_solutions/secure_voice.htm, as accessed on Dec. 31, 2008.
CELLCRYPT, CellCrypt Mobile, 1 page, http://www.cellcrypt.com/c_mobile.htm, as accessed on Dec. 31, 2008.

* cited by examiner

*Primary Examiner* — Cong Tran

(57) ABSTRACT

An exemplary computing system may receive a first request from a first voice-communication device to establish a secure-voice-communication session with a second voice-communication device. The computing system may also receive a second request from the second voice-communication device to establish the secure-voice-communication session with the first voice-communication device. The computing system may establish the secure-voice-communication session between the first and second voice-communication devices. Corresponding methods, apparatus, and computer-readable media are also disclosed.

25 Claims, 9 Drawing Sheets

METHODS, SYSTEMS, AND APPARATUS FOR HANDLING SECURE-VOICE-COMMUNICATION SESSIONS

BACKGROUND INFORMATION

Security in telephone calls is becoming increasingly important, particularly with many calls being made over packet-switched networks. Traditional packet-switched telephone calls are vulnerable to packet sniffing and various other types of attacks. Fortunately, packet-switched networks may provide greater security potential than traditional circuit-switched networks. For example, telephone service providers may be able to use a variety of Internet Protocol ("IP") based security techniques to protect calls on packet-switched networks.

One IP-based security technique used to protect packet-switched calls is encryption. Telephone service providers may attempt to secure a call by encrypting voice data exchanged during the call. However, traditional call-encryption techniques may be inefficient and/or inconvenient. For example, certain call-encryption techniques may not provide for mobility, or may only provide for limited mobility, of communication devices connected to a secure call. As another example, some traditional call-encryption techniques may require burdensome call management processing, such as frequent or continual registration signaling.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

The present disclosure is directed to systems, methods, and apparatus for handling secure-voice-communication sessions. To establish a secure-voice-communication session, a first voice-communication device may send a secure-application subsystem a first request to establish a secure-voice-communication session with a second voice-communication device. Similarly, the second voice-communication device may send the secure-application subsystem a second request to establish a secure-voice-communication session with the first voice-communication device. A request to establish a secure-voice-communication session is also referred to herein as a secure-voice-communication-session request. After receiving the first and second secure-voice-communication-session requests, the secure-application subsystem may establish the secure-voice-communication session between the first and second voice-communication devices.

In some embodiments, both a first user (i.e., a user of the first voice-communication device) and a second user (i.e., a user of the second voice-communication device) may decide to request establishment of the secure-voice-communication session. Without any prompting from their voice-communication devices, the first and second users may cause their voice-communication devices to send the first and second secure-voice-communication-session requests to the secure-application subsystem.

In other embodiments, a first user may want to establish a secure-voice-communication session with a second user, but the second user may not know that the first user wants to establish the secure-voice-communication session. The first user may use the first voice-communication device to instruct the secure-application subsystem to prompt the second voice-communication device to send a request to join the secure-voice-communication session. The secure-application subsystem may send a communication to the second voice-communication device prompting the second voice-communication device to send a request to join the secure-voice-communication session. In response to the communication from the secure-application subsystem, the second voice-communication device may send the secure-application subsystem a request to establish a secure-voice-communication session with the first voice-communication device.

In some embodiments, the secure-application subsystem may use a base network to handle one or more call-management tasks associated with the secure-voice-communication session. For example, the secure-application subsystem may use the base network to perform one or more steps to setup the secure-voice-communication session. In various embodiments, the secure-application subsystem may use the base network to handle a mobility-management task, a presence-management task, a call-control task, and/or any other call-management task.

Figure 1:
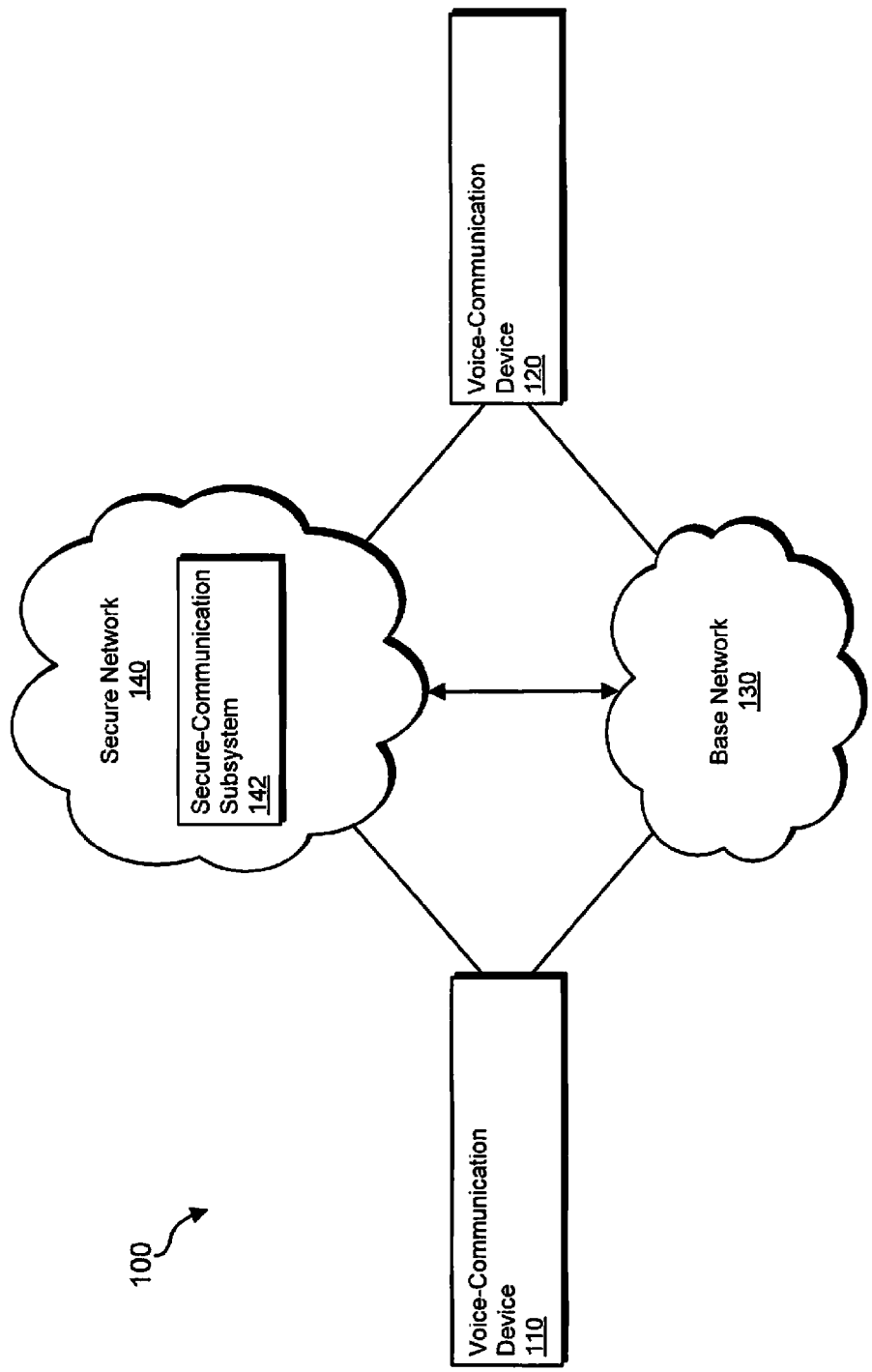
FIG. 1 is a block diagram of an exemplary voice-communication system.

FIG. 1 shows an exemplary system 100 for handling secure-voice-communication sessions. The components of system 100 may include or be implemented as hardware, computing instructions (e.g., software) embodied on at least one computer-readable medium, or a combination thereof. Accordingly, system 100 may be referred to as a "computing system." System 100 may include voice-communication devices 110 and 120. System 100 may also include a base network 130 and a secure network 140. Voice-communication device 110 and/or voice-communication device 120 may use base network 130 for unsecured-voice-communication sessions. Voice-communication devices 110 and 120 may use secure network 140 for secure-voice-communication sessions.

Voice-communication devices 110 and 120 may include mobile telephones, landline telephones, personal digital assistants, hybrid packet-circuit switched communication devices, VoIP devices, desktop or laptop computers with integrated microphones and speakers, or any other devices used for voice communications. In some embodiments, voice-communication devices 110 and 120 may be different types of devices (e.g., voice communication device 110 may be a VoIP telephone and voice-communication device 120 may be a desktop computer).

Voice-communication devices 110 and 120 may communicate with and/or through base network 130. Base network 130 may include any type of communication network. For example, base network 130 may include a telecommunications-grade network. In some embodiments, base network may include a packet-switched network and/or a circuit-switched network (e.g., base network 130 may include a packet-switched data network and a circuit-switched voice network).

A packet-switched network may include a Local Area Network ("LAN"), a Metropolitan Area Network ("MAN"), a wide area network ("WAN"), an intranet, the Internet, a Voice over IP ("VoIP") network, an IP Multimedia Subsystem ("IMS") network, and/or a Public Land Mobile Network ("PLMN"). A PLMN may include a packet-switched mobile network, such as, for example, a General Packet Radio Service ("GPRS"), a Cellular Digital Packet Data ("CDPD") network, and/or a mobile IP network.

A packet-switched network may use one or more communication protocols to establish communication sessions, tear down communication sessions, and/or to transmit data during communication sessions. For example, a packet-switched network may use a Transmission Control Protocol/Internet Protocol ("TCP-IP"), a Session Initiation Protocol ("SIP"), a SIP for Telephones ("SIP-T") protocol, a secure SIP protocol, a signaling System Number 7 ("SS7") protocol, a SIGTRAN protocol, a Stream Control Transmission Protocol ("SCTP"), and/or any other protocol capable of establishing a communication session, tearing down a communication session, and/or transmitting data during a communication session.

As noted, base network 130 may include a circuit-switched network. A circuit-switched network may include a Public Switched Telephone Network ("PSTN"), an integrated services digital network ("ISDN"), a Code Division Multiple Access ("CDMA") network, an IP Multimedia Subsystem ("IMS") network, a Time Division Multiple Access ("TDMA") network, and/or any other suitable circuit-switched telecommunications network. A TDMA network may include a Global System for Mobile communications ("GSM") network, a Personal Digital Cellular ("PDC") network, an integrated Digital Enhanced Network ("iDEN"), a Digital Enhanced Cordless Telecommunications ("DECT") network, and/or a satellite phone system.

Base network 130 may include any suitable wired and/or wireless networks. Examples of wireless networks may include cellular networks, Personal Communications Service ("PCS") networks, Wi-Fi networks (e.g., IEEE 802.11 networks), Worldwide interoperability for Microwave Access ("WiMAX") networks, and/or Long Term Evolution ("LTE") wireless networks. Wireless networks may include second generation ("2G") wireless technologies, second-and-a-half generation ("2.5G") wireless technologies, third generation ("3G") wireless technologies, and/or fourth generation ("4G") wireless technologies.

As mentioned, in addition to base network 130, system 100 may include secure network 140. Secure network 140 may include any network technology capable of providing and/or facilitating secure communications between voice-communication devices 110 and 120. For example, secure network 140 may include one or more of the packet-switched networks mentioned above. Secure network 140 may include a wired network and/or a wireless network. For example, secure network 140 may include one or more of the wireless networks mentioned above. Secure network 140 may use one or more communication protocols to establish communication sessions, tear down communication sessions, and/or to transmit data during communication sessions. For example, secure network 140 may use one or more of the communication protocols mentioned above.

Secure network 140 may include a secure-communication subsystem 142. Secure-communication subsystem 142 may include or be implemented as hardware, computing instructions (e.g., software) embodied on at least one computer-readable medium, or a combination thereof capable of providing, facilitating, and/or otherwise handling secure communications between voice-communication devices 110 and 120. For example, secure-communication subsystem 142 may include an application server, a media server, and/or any other network device capable of performing one or more tasks related to providing secure communications. Tasks related to providing secure communications may include, for example, establishing a secure-voice-communication session, tearing down a secure-voice-communication, and/or transmitting data for a secure-voice-communication session.

Figure 2:
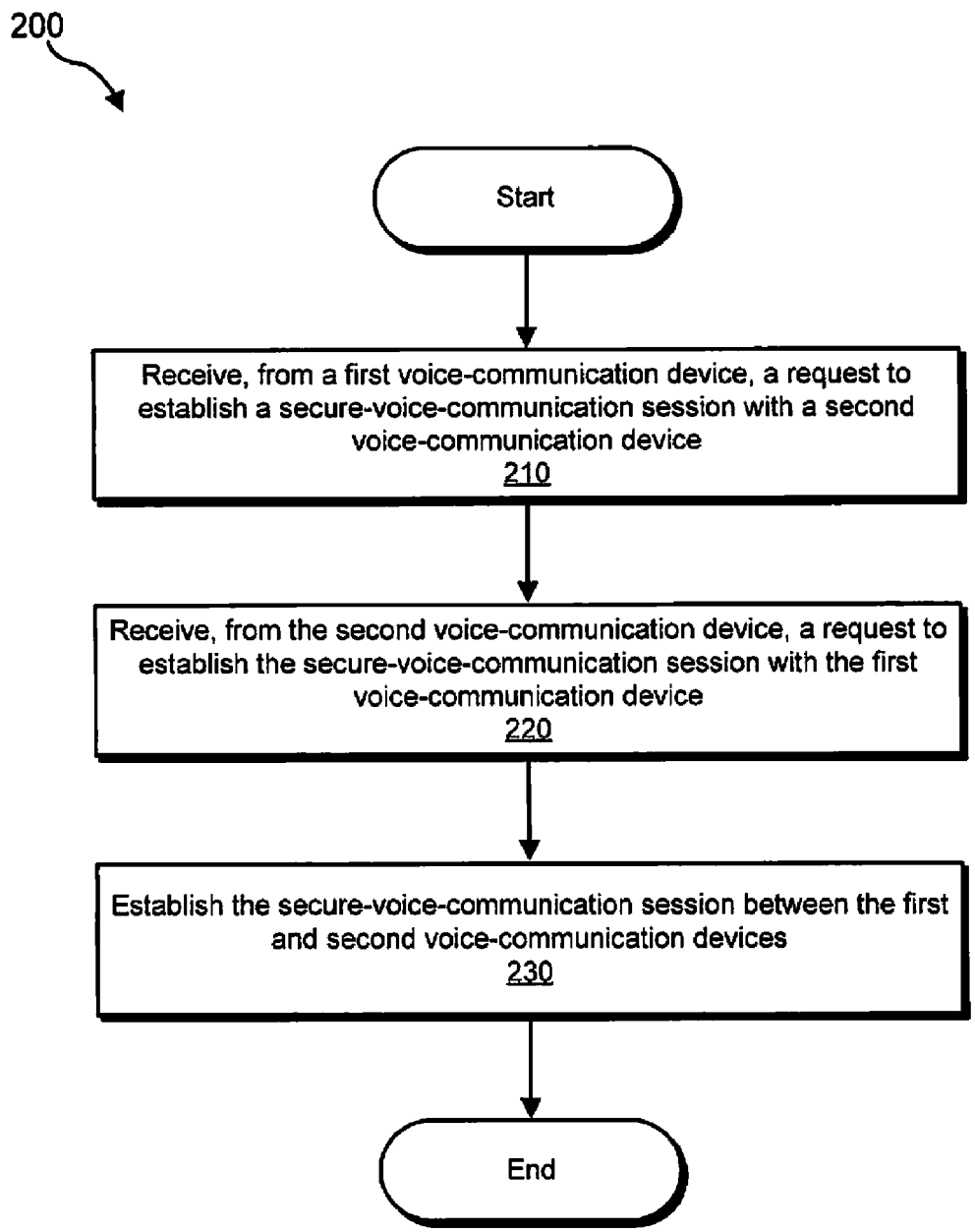
FIG. 2 is a flow diagram of an exemplary method for handling secure-voice-communication sessions.

FIG. 2 shows steps that may be performed by a computing system, such as system 100, to establish a secure-voice-communication session. One or more of the steps shown in FIG. 2 may be performed by voice-communication device 110, voice-communication device 120, and/or secure-communication subsystem 142. For example, secure-communication subsystem 142 may receive a request from voice-communication device 110 to establish a secure-voice-communication session with voice-communication device 120 (step 210). The request may include any communication that initiates a process for establishing a secure-voice-communication session. For example, the request may include a communication that initiates a secure registration process with secure-communication subsystem 142. The request may additionally or alternatively include an invitation for voice-communication device 120 to join the secure-voice-communication session.

Secure-communication subsystem 142 may also receive a request from second voice-communication device 120 (step 220). The request from second voice-communication device 120 may request to establish a secure-voice-communication session with first voice-communication device 110. If secure-communication subsystem 142 receives the request from voice-communication device 110 before receiving the request from voice-communication device 120, secure-communication subsystem 142 may hold the request from voice-communication device 110 until it receives the request from voice-communication device 120. If secure-communication subsystem 142 receives the request from voice-communication device 120 before receiving the request from voice-communication device 110, secure-communication subsystem 142 may hold the request from voice-communication device 120 until it receives the request from voice-communication device 110.

In some embodiments, the request from voice-communication device 110 may indicate that voice-communication device 120 should be prompted to join the secure-voice-communication session. In response to the request to prompt voice-communication device 120, secure-communication subsystem 142 may communicate with voice-communication device 120 to prompt voice-communication device 120 to send a request to join the secure-voice-communication session. For example, secure-communication subsystem 142 may send a communication to voice-communication device 120 over base network 130.

In other embodiments, the request from voice-communication device 110 may not indicate that voice-communication device 120 should be prompted to join the secure-voice-communication session. In such embodiments, secure-communication subsystem 142 may hold the request from voice-communication device 1 10 for a predefined period of time. If secure-communication subsystem 142 does not receive a request from voice-communication device 120 within the predefined period of time, secure-communication subsystem 142 may communicate with voice-communication device 120 to prompt voice-communication device 120 to send the request.

Secure-communication subsystem 142 may use information from the requests from first and second voice-communication devices 110 and 120 to determine that the requests are associated with each other. For example, secure-communication subsystem 142 may determine that the request from first voice-communication device 110 identifies second voice-communication device 120. Secure-communication subsystem 142 may also determine that the request from second voice-communication device 120 identifies first voice-communication device 110. After determining that voice-communication devices 110 and 120 have requested a secure-voice-communication session with each other, secure-communication subsystem 142 may establish the secure-voice-communication session between voice-communication device 110 and voice-communication device 120 (step 230).

In certain embodiments, secure-communication subsystem 142 may establish the secure-voice-communication session by hair-pinning a Secure Real Time Transport Protocol ("SRTP") session through a media subsystem, such as a media server. In other embodiments, secure-communication subsystem 142 may establish the secure-voice-communication session by using any other secure protocol capable of facilitating secure communications between voice-communication device 110 and voice-communication device 120. The discussion corresponding to FIGS. 6 and 7 provides additional details and alternatives regarding establishing a secure-voice-communication session. For example, one or more of steps 626-650 in FIG. 6 and/or steps 720-736 in FIG. 7 may be part of a process for establishing a secure-voice-communication session between two voice-communication devices.

A voice-communication session may include one or more transmissions of voice data between two or more communication devices. For example, a voice-communication session may include a telephone call with two participants, a conference call with any number of participants, a voice-chat session, and/or the process of leaving a voicemail message. A secure-voice-communication session may include any voice-communication session where voice data for the session is encrypted and/or where a secure subsystem is used as a secure meeting point for the voice-communication session (examples of using a secure meeting point for a voice-communication sessions are shown in FIGS. 6-8). In contrast, an unsecured-voice-communication session may include any voice-communication session where the voice data is not encrypted and/or a secure subsystem is not used as a secure meeting point for the voice-communication session.

In some embodiments, secure-communication subsystem 142 may use base network 130 to handle at least one call-management task associated with the secure-voice-communication session. Secure-communication subsystem 142 may use base network 130 to perform any call-management task related to establishing the secure-voice-communication session, tearing-down the secure-voice-communication session, and/or managing the secure-voice-communication session. For example, secure-communication subsystem 142 may use base network 130 to handle one or more call-management tasks by relying on base network 130 to handle mobility management, relying on base network 130 to handle presence and availability management, using base network 130 to setup the voice-communication session, and/or relying on base network 130 to handle call control.

Secure-communication subsystem 142 may use base network 130 to handle a call-management task by relying on base network 130 to perform one or more mobility-management tasks for the secure-voice-communication session. For example, base network 130, rather than secure-communication subsystem 142, may handle a mobility-management task for voice-communication devices 110 and/or 120. In contrast, certain traditional telephone-call-security systems may perform call management processing (e.g., frequent or continual registration signaling to update a SIP server with location information of communication devices). In such traditional systems, the call-management processing for secure calls with a device is generally performed in addition to the call-management processing being performed by a network that handles unsecured calls for the device.

In some embodiments, secure-communication subsystem 142 may be able to rely on base network 130 to handle mobility management at least because each voice-communication device attempting to connect to a secure-voice-communication session may initiate communication with secure-communication subsystem 142. Thus, secure-communication subsystem 142 may not need to maintain location information for voice-communication devices 110 and 120, and voice-communication devices 110 and 120 may not need to send updated location information to secure-communication subsystem 142 when there is not a secure-voice-communication session being requested or otherwise handled. Instead, when first and second voice-communication devices 110 and 120 contact secure-communication subsystem 142 to request a secure-voice-communication session, first and second voice-communication devices 110 and 120 may send location information that allows secure-communication subsystem 142 to communicate with first and second voice-communication devices 110 and 120, including establishing a secure-voice-communication session between the first and second voice-communication devices.

Base network 130 may handle any mobility-management task related to tracking the location (i.e., managing location information) of either or both of voice-communication devices 110 and 120. Location information may include an IP address of a voice-communication device, current and previous location identification information from a mobile voice-communication device, data stored in a Home Location Register ("HLR"), data stored in a Visitor Location Register ("VLR"), a Mobile Station Roaming Number ("MSRN"), and/or any other information that may be helpful for communicating with the first and/or second voice-communication devices 110 and 120.

Base network 130 may manage location information by handling a location-update procedure for a voice-communication device, such as voice-communication device 110. Base network 130 may handle one or more steps in a location-update procedure. As an example, voice-communication device 110 may inform base network 130 when voice-communication device 110 moves from one geographic location area to another. For example, voice-communication device 110 may move from location area 'x' to location area 'y' in a wireless network footprint. When voice-communication device 110 detects that it is in location area 'y,' voice-communication device 110 may send base network 130 a location update request that identifies its previous location 'x,' its current location 'y,' and provides device identification information (e.g., a Temporary Mobile Subscriber Identity ("TMSI")). As part of the location update procedure, base network 130 may use the location information from voice-communication device 110 to update an HLR and/or a VLR.

In addition to or instead of handling location information, base network 130 may perform a mobility-management task for the secure-voice-communication session by handling a handoff procedure. A handoff procedure may include transferring an ongoing call or data session from one channel of a network to another channel of the network. In a cellular network, a handoff may be performed when a voice-communication device moves out of an area covered by one cell and into an area covered by another cell. Base network 130 may perform a handoff by releasing a channel in a source cell and engaging a channel in a target cell.

In some embodiments, secure-communication subsystem 142 may use base network 130 to handle a call-management task by using base network 130 to handle one or more presence-management tasks. For example, secure-communication subsystem 142 may rely on base network 130 to manage presence information associated with the secure-voice-communication session. Base network 130, instead of secure-communication subsystem 142, may handle presence information before, during, and/or after the secure-voice-communication session.

Presence information may indicate the availability of a voice-communication device to participate in a voice-communication session. Presence information for a voice-communication device may be stored as a presence state in a presence service of base network 130. Presence states may include "free," "busy," "away," "do not disturb," etc. In some embodiments, base network 130 may store the presence state of a voice-communication device in a personal availability record.

Base network 130 may distribute presence information for one voice-communication device to other communication devices. For example, base network 130 may store presence information for voice-communication device 110 and may distribute the presence information to voice-communication device 120 and/or other voice-communication devices. If voice-communication device 110 is participating in a secure-voice-communication session with voice-communication device 120, base network 130 may notify a third voice-communication device that voice-communication device 110 is "busy" and is not available to take a call.

Secure-communication subsystem 142 may use base network 130 to handle a call-management task by relying on base network 130 to handle one or more setup tasks for the secure-voice-communication session. For example, voice-communication device 110 and/or voice-communication device 120 may use base network 130 to send a secure-voice-communication-session request to secure-communication subsystem 142. In some embodiments, secure-communication subsystem 142 may use base network 130 to handle a setup task by using base network 130 to prompt a voice-communication device to join a secure-voice-communication session.

In some embodiments, secure-communication subsystem 142 may use base network 130 to handle a call-management task by relying on base network 130 to handle one or more call-control tasks. For example, base network 130 may manage call-waiting, call-forward-on-busy, and/or do-not-disturb functions for a secure-voice-communication session.

As discussed, secure-communication subsystem 142 may use base network 130 to handle a call-management task by using base network 130 to handle a mobility-management task, a presence-management task, a setup task, and/or a call-control task. Base network 130 may also handle any other suitable call-management tasks for a secure-voice-communication session. In some embodiments, base network 130 may only handle one call-management task for the secure-voice-communication session (e.g., base network 130 may only handle a mobility-management task for the secure-voice-communication session). In other embodiments, base network 130 may handle multiple call-management tasks for the secure-voice-communication session (e.g., base network 130 may handle a mobility-management task and a presence-management task for the secure-voice-communication session).

Figure 3:
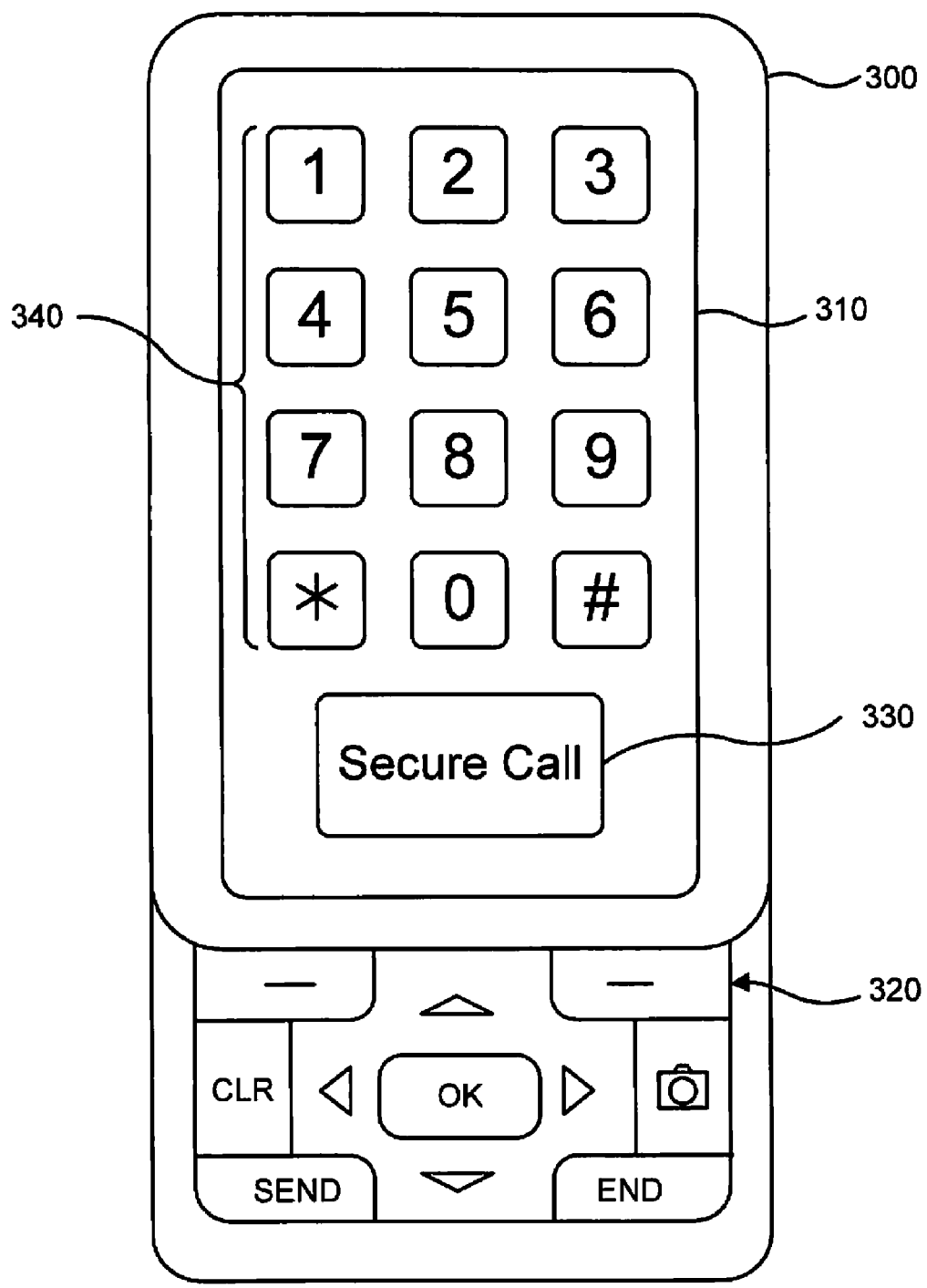
FIG. 3 is a block diagram of an exemplary voice-communication device.

FIG. 3 shows a voice-communication device 300 that is configured to participate in a secure-voice-communication session. Voice-communication device 300 may include a touch screen 310 and hard buttons 320. Touch screen 310 may display a secure-call soft button 330 and a soft number pad 340. A user may cause voice-communication device 300 to request a secure-voice-communication session by selecting secure-call soft button 330. In other embodiments, a user may provide other input (e.g., selecting one or more buttons in soft number pad 340 and/or hard buttons 320 or providing a voice prompt) to initiate a secure-voice-communication session. In some embodiments, a user may provide input to voice-communication device 300 indicating that a remote voice-communication device should be prompted to join a secure-voice-communication session.

Figure 4:
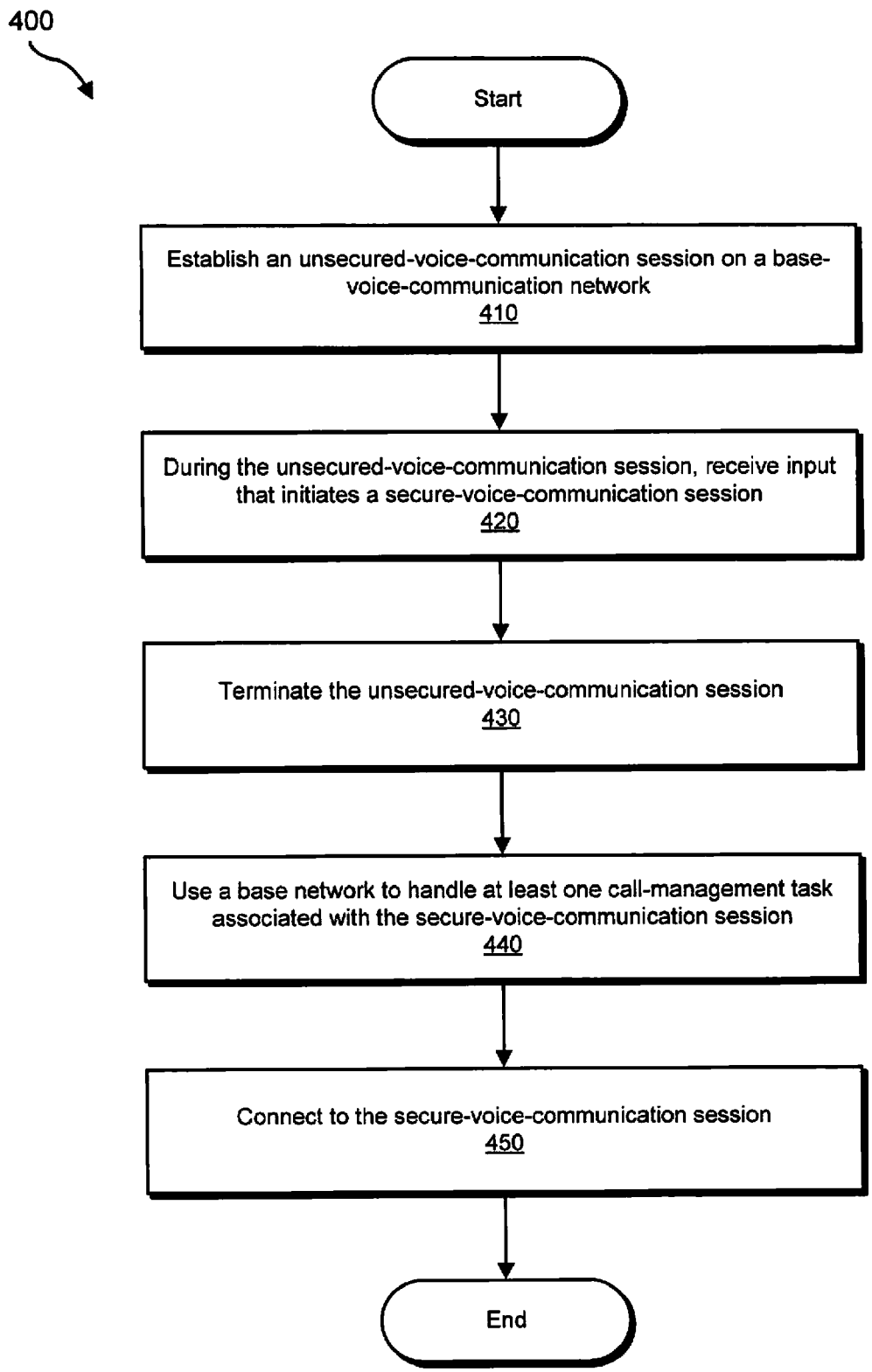
FIG. 4 is a flow diagram of an exemplary method for handling secure-voice-communication sessions.

FIG. 4 shows a process for transitioning from an unsecured-voice-communication session to a secure-voice-communication session. The steps shown in FIG. 4 may be performed by a voice-communication device, such as voice-communication devices 110, 120, or 300. The steps shown in FIG. 4 may additionally or alternatively be performed by any other computing system or device. In one example, a voice-communication device may establish an unsecured-voice-communication session over a base network (step 410). The unsecured-voice-communication session may be established in any suitable way, such as by using Common Channel Signaling ("CCS") (e.g., Signaling System Number 7 ("SS7") protocol or Integrated Services Digital Network ("ISDN") protocol).

During the unsecured-voice-communication session, a voice-communication device may receive input (e.g., user input) that initiates a secure-voice-communication session (step 420). The input may be received when a user selects a secure call button or provides other input recognized as a request to initiate a secure-voice-communication session. In response to the request to initiate the secure-voice-communication session, the voice-communication device may terminate the unsecured-voice-communication session (step 430). The voice-communication device may terminate the unsecured-voice-communication session by disconnecting and/or tearing down the unsecured-voice-communication session.

The voice-communication device may use a base network to handle at least one call-management task associated with the secure-voice-communication session (step 440). In some embodiments, the voice-communication device uses the base network to perform a mobility-management task, a call-control task, a call-setup task, a presence-management task, and/or any other call-management task. For example, the voice-communication device may use the base network to send a request to establish a secure-voice-communication session to a secure-communication subsystem.

As another example, the voice-communication device may communicate with the base network to handle presence information associated with the secure-voice-communication session. For example, when the voice-communication device joins the secure-voice-communication session, the voice-communication device may instruct the base network to change a presence state for the voice-communication device to "busy." When the voice-communication device terminates the secure-voice-communication session, the voice-communication device may instruct the base network to change the presence state to "available."

The voice-communication device may perform one or more steps to connect to the secure-voice-communication session (step 450). Connecting to the secure-voice-communication session (i.e., joining the secure-voice-communication session) may include registering with a secure-communication subsystem, receiving connection information for the secure-voice-communication session from the secure-communication subsystem, using the connection information to connect to the secure-communication subsystem, and/or performing any other step for connecting to the secure-voice-communication session.

In some embodiments, the voice-communication device may terminate the unsecured-voice-communication session before establishing the secure-voice-communication session. In other embodiments, the voice-communication device may establish the secure-voice-communication session before, or at substantially the same time as, terminating the unsecured-voice-communication session. By waiting to terminate the unsecured-voice-communication session until the secure-voice-communication session is established or substantially established, the voice-communication device may provide uninterrupted, or substantially uninterrupted, voice communications during the transition from the unsecured-voice-communication session to the secure-voice-communication session. Accordingly, the transition may be transparent to a user of a voice-communication device.

Figure 5:
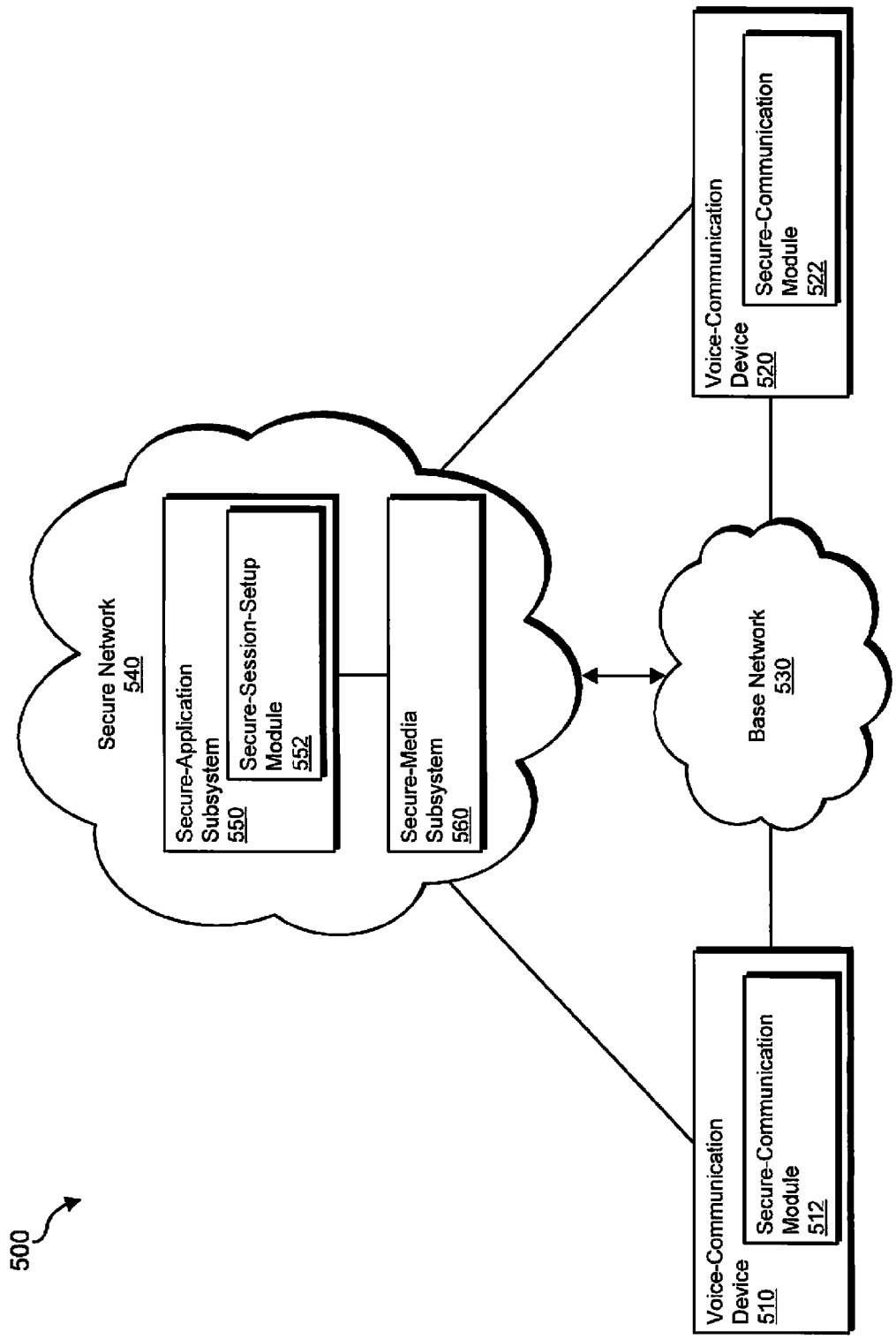
FIG. 5 is a block diagram of an exemplary voice-communication system.

FIG. 5 shows an exemplary system 500, which may be an exemplary implementation of system 100. System 500 may include a voice-communication device 510 having a secure-communication module 512. System 500 may also include a voice-communication device 520 having a secure-communication module 522. Voice-communication devices 510 and 520 may also include user interfaces programmed to receive input that initiates a secure-voice-communication session and network interfaces programmed to communicate with base network 530 and/or secure network 540 to handle secure and unsecured voice-communications.

Base network 530 may handle unsecured-voice-communication sessions between voice-communication devices 510 and 520. Secure-communication modules 512 and 522 may be programmed to communicate with base network 530, connect to unsecured-voice-communication sessions, and/or to handle at least one call-management task associated with a secure-voice-communication session. Secure-communication module 512 and 522 may also communicate with one or more components of secure network 540, which may handle secure-voice-communication sessions between voice-communication devices 510 and 520.

Secure network 540 may include a secure-application subsystem 550. Secure-application subsystem 550 may include a secure-application server, such as a secure Session Initiation Protocol ("SIP") server. Secure-application subsystem 550 may also include any other type of server or other computing system.

Secure-application subsystem 550 may include a secure-session-setup module 552. Secure-session-setup module 552 may be programmed to receive requests to establish a secure-voice-communication session from voice-communication device 510 and/or voice-communication device 520. Secure-session-setup module 552 may also be programmed to establish secure-voice-communication sessions between voice-communication devices 510 and 520.

In various embodiments, secure-session-setup module 552 may be programmed to send a secure-voice-communication-session request to a secure-media subsystem 560. Secure-media subsystem 560 may include a media server capable of serving as a meeting point for a secure-voice-communication session between voice-communication devices 510 and 520. Secure-media subsystem 560 may additionally or alternatively include any other suitable computing system. Secure-media subsystem 560 may be programmed to respond to the secure-voice-communication-session request by sending communication information, such as IP addresses and ports, for the secure-voice-communication session to secure-session-setup module 552.

In some embodiments, secure-session-setup module 552 may be programmed to send the IP addresses and ports for the secure-voice-communication session to voice-communication devices 510 and 520. Secure-session-setup module 552 may also be programmed to create a session key and to send the session key to voice-communication devices 510 and 520. While FIG. 5 shows secure-application subsystem 540 and secure-media subsystem 560 as separate components, in certain other embodiments, secure-application subsystem 550 may include secure-media subsystem 560. For example, secure-application subsystem 550 may perform one or more functions provided by secure-media subsystem 560.

Secure-session-setup module 552, secure-communication module 512, and secure-communication module 522 may be any modules, applications, or other computer-executable code programmed to perform one or more of the steps discussed in the present disclosure. While FIG. 5 shows secure-session-setup module 552 installed on a secure-application subsystem 550, secure-session-setup module 552 may also be installed on various other network devices, such as servers, media subsystems, and client devices. Similarly, secure-communication modules 512 and 522 may be installed on any suitable computing devices in a communication system.

Systems presented in the instant disclosure, such as systems 100 and 500, are also referred to herein as computing systems. In some examples, system 100, system 500, or one or more components of systems 100 and/or 500, may include any computer hardware and/or instructions (e.g., software programs), or combinations of software and hardware, configured to perform one or more of the processes described herein. In particular, it should be understood that components of systems 100 and 500 may include and/or may be implemented on one physical computing device or may include and/or may be implemented on more than one physical computing device. Accordingly, systems 100 and/or 500 may include any number of computing devices, and may employ any number of computer operating systems.

Accordingly, one or more of the processes described herein may be implemented at least in part as computer-executable instructions, i.e., instructions executable by one or more computing devices, tangibly embodied in a computer-readable medium. For example, such instructions may include one or more software, middleware, and/or firmware application programs tangibly embodied in one or more computer-readable media and configured to direct one or more computing devices to perform one of more of the processes described herein. In general, a processor (e.g., a microprocessor) receives instructions, from a computer-readable medium (e.g., from a memory), and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 6A:
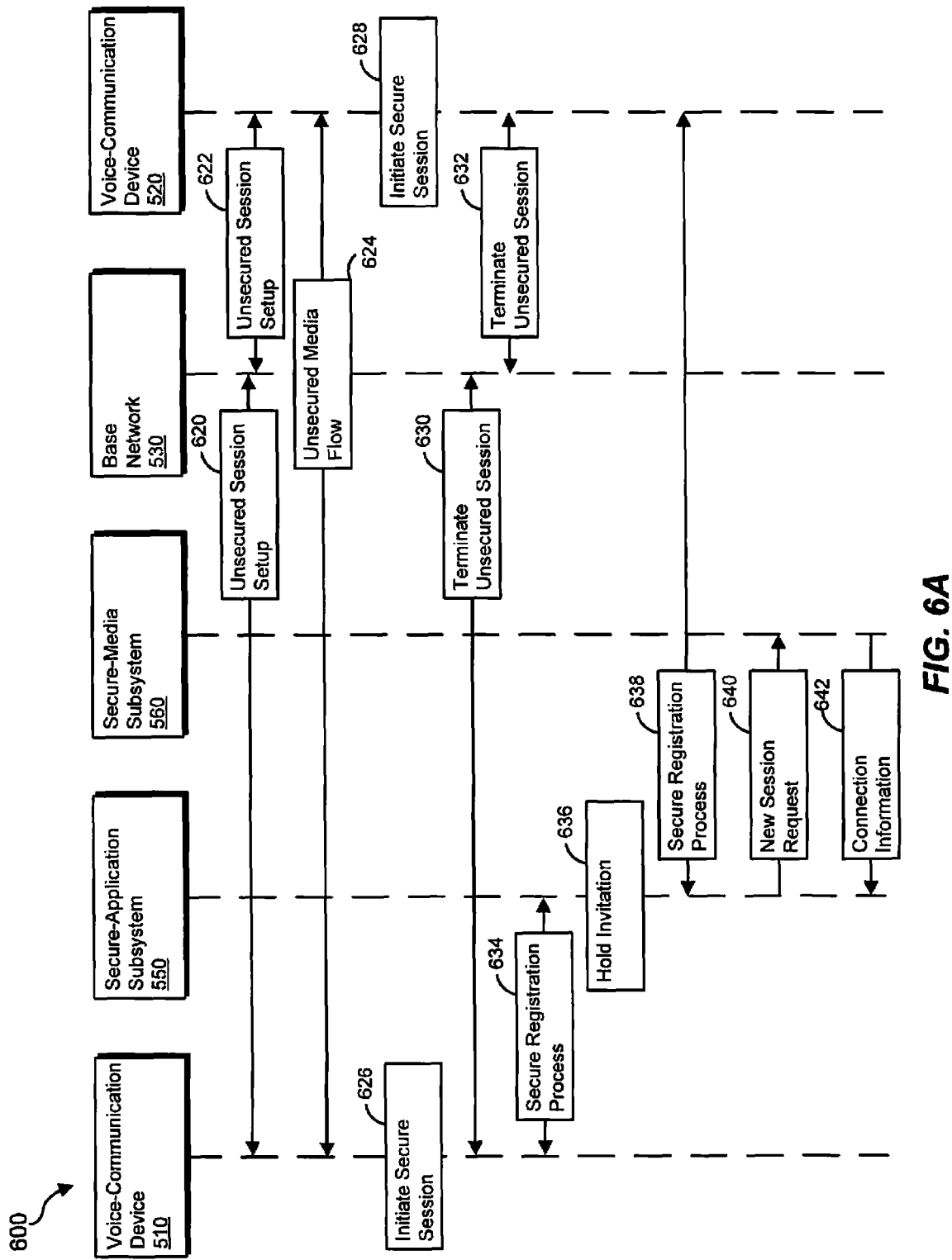
FIGS. 6A and 6B are a block diagram of an exemplary communication flow for establishing a secure-voice-communication session.
Figure 6B:
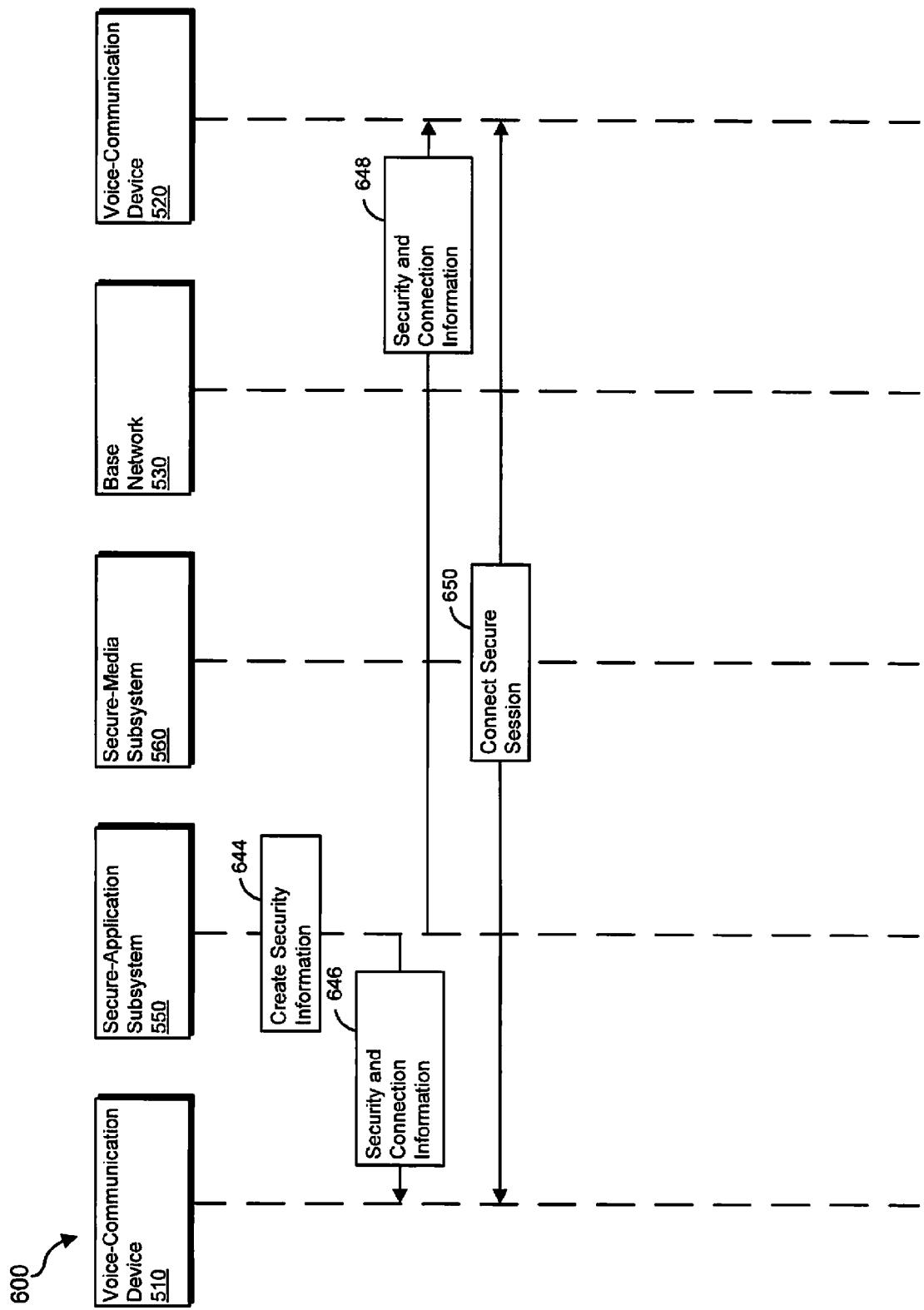
Figure 7:
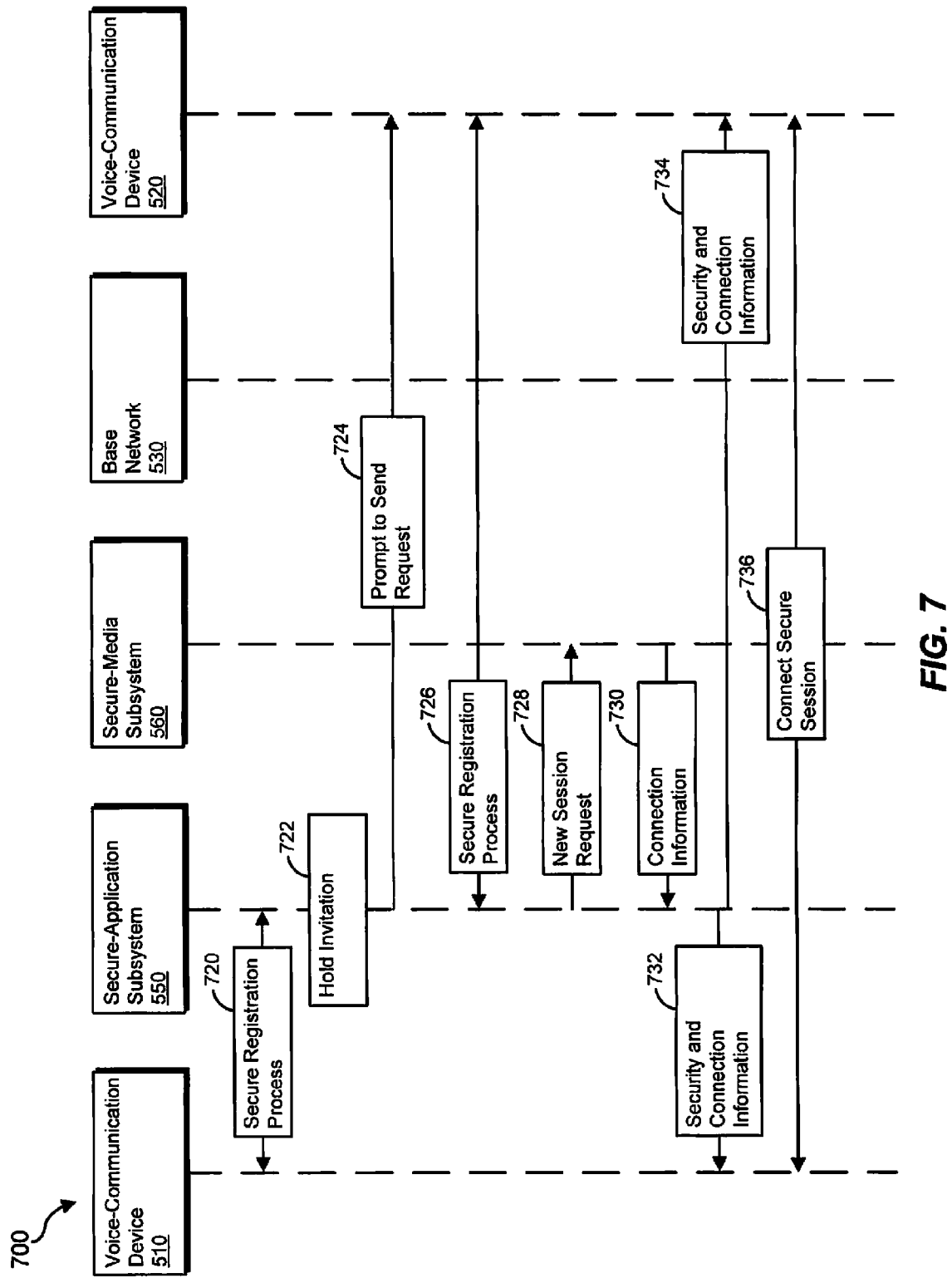
FIG. 7 is a block diagram of another exemplary communication flow for establishing a secure-voice-communication session.
Figure 8:
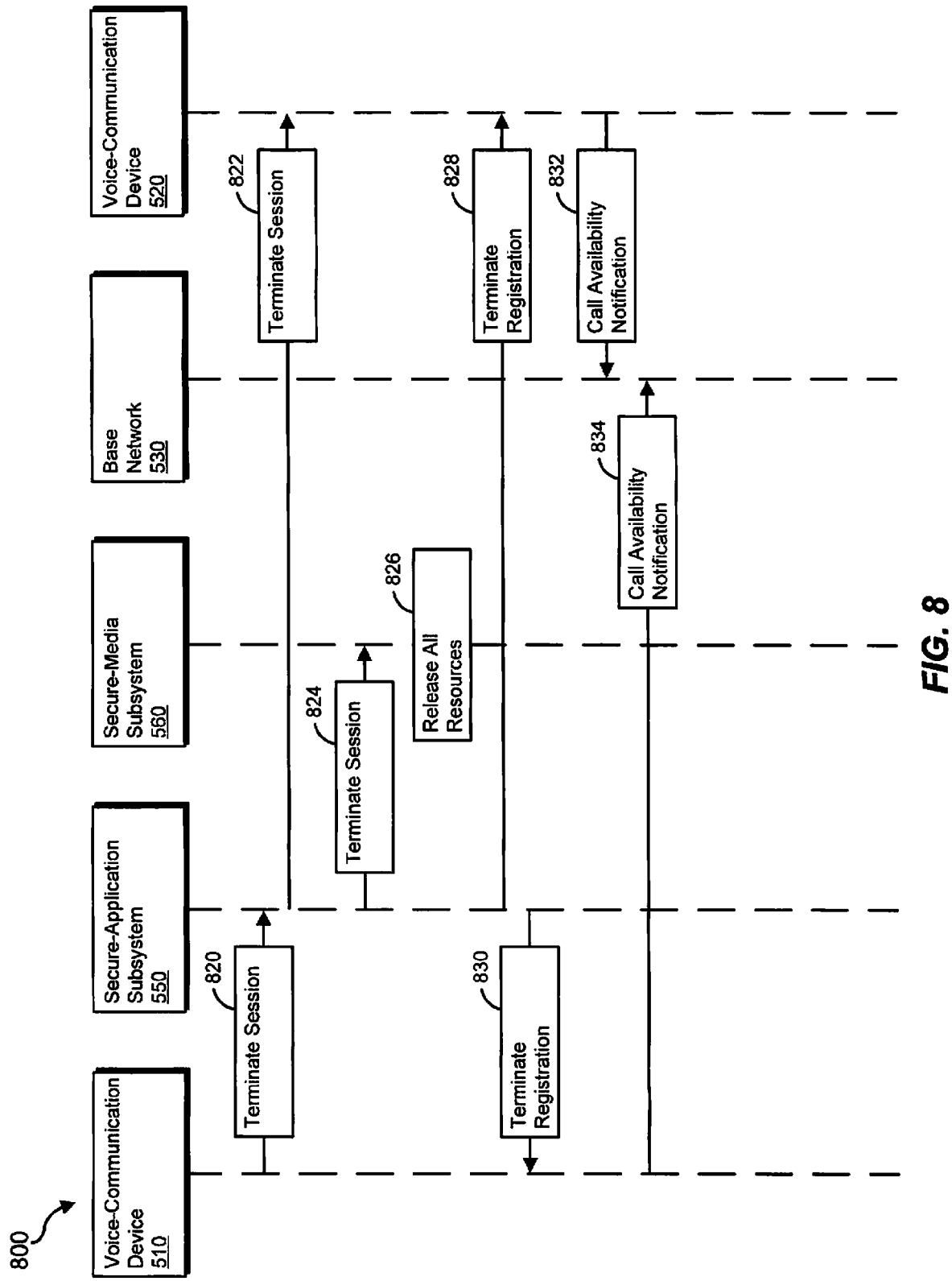
FIG. 8 is a block diagram of an exemplary communication flow for terminating a secure-voice-communication session.

FIGS. 6-8 show exemplary communications between components of system 500. FIGS. 6A and 6B show a process for transitioning from an unsecured-voice-communication session to a secure-voice-communication session. The process of terminating an unsecured-voice-communication session and establishing a secure-voice-communication session may be performed in a manner that is transparent to users of voice-communication devices 510 and 520. For example, the unsecured-voice-communication session may be terminated and the secure-voice-communication session may be established with little or no interruption of voice communications between voice-communication devices 510 and 520.

As shown in FIG. 6A, voice-communication device 510 may establish an unsecured-voice-communication session with voice-communication device 520 over base network 530 (steps 620 and 622). Voice-communication device 510 may initiate the unsecured-voice-communication session by calling voice-communication device 520. During the unsecured-voice-communication session, voice-communication device 510 may communicate with voice-communication device 520 over base network 530 (step 624). In other words, base network 530 may handle an unsecured flow of voice media between voice-communication devices 510 and 520.

The users of voice-communication devices 510 and 520 may decide to switch to a secure-voice-communication session. Each user may cause his or her voice-communication device to initiate a secure-voice-communication session (steps 626 and 628). The secure-voice-communication session may be initiated when the users press secure-call soft buttons or provide other input that initiates a secure-voice-communication session, for example. In response to the users' requests to initiate the secure-voice-communication session, voice-communication devices 510 and 520 may terminate the unsecured-voice-communication session (steps 630 and 632).

Voice-communication device 510 may initiate a secure registration process with secure-application subsystem 550 (step 634). In some embodiments, voice-communication device 510 may initiate the secure registration process by sending secure-application subsystem 550 an invitation for establishing a secure-voice-communication session with voice-communication device 520. Secure-application subsystem 550 may hold the invitation for voice-communication device 520 to join the secure-voice-communication session (step 636) until voice-communication device 520 registers with secure-application subsystem 550 (step 638). In some embodiments, secure-application subsystem 550 may hold the invitation for a predetermined time period (e.g., twenty seconds). If the predetermined time period expires before voice-communication device 520 registers with secure-application subsystem 550, secure-application subsystem 550 may prompt voice-communication device 520 to register with secure-application subsystem 550.

In other embodiments, if the predetermined time period expires before voice-communication device 520 registers with secure-application subsystem 550, secure-application subsystem 550 may release the invitation for voice-communication device 550 to join the secure-voice-communication session. To establish the secure-voice-communication session, voice-communication device 510 may resend the invitation and/or reregister with secure-application subsystem 550.

The secure-registration processes shown in steps 634 and 638 may be performed using secure SIP, link level encryption, selected SIP message header encryption, Transaction Level Security ("TLS"), an IP security ("IPsec") session, and/or any other secure-communication technology. Communications in the secure-registration processes shown in steps 634 and 638 may include secure-voice-communication-session requests from voice-communication devices 510 and 520. The secure-registration processes shown in steps 634 and 638 may also include communications for authenticating voice-communication devices 510 and 520.

Secure-application subsystem 550 may authenticate voice-communication devices 510 and 520 by using any suitable authentication process. For example, secure-application subsystem 550 may authenticate voice-communication devices 510 and 520 by authenticating digital certificates from voice-communication devices 510 and 520 and/or by requiring users of voice-communication devices 510 and 520 to enter passwords.

After voice-communication devices 510 and 520 register with secure-application subsystem 550, secure-application subsystem 550 may request a new session with secure-media subsystem 560 (step 640). For example, secure-application subsystem 550 may ask secure-media subsystem 560 to provision resources for the secure-voice-communication session. In response, secure-media subsystem 560 may provision resources for the secure-voice-communication session and may send connection information for the secure-voice-communication session to secure-application subsystem 550 (step 642). In some embodiments, the connection information may include IP addresses and ports for the secure-voice-communication session. Secure-media subsystem 560 may also set up internal firewall rules that allow only voice-communication devices 510 and 520 to connect to the secure-voice-communication session.

After secure-application subsystem 550 receives the connection information from secure-media subsystem 560, secure-application subsystem 550 may create security information (step 644), as shown in FIG. 6B. In other embodiments, rather than creating security information, secure-application subsystem 550 may identify predefined security information. The security information may include any information that may enable voice-communication devices 510 and 520 to participate in a secure-voice-communication session. For example, the security information may be a session key for the secure-voice-communication session.

Secure-application subsystem 550 may send the security information and the connection information to voice-communication devices 510 and 520 (steps 646 and 648). Secure-application subsystem 550 may use any suitable communication channel to send the security and connection information to voice-communication device 510 and 520. For example, secure-application subsystem 550 may send the connection and security information over secure-communication channels established during the secure registration processes shown in steps 634 and 638.

Voice-communication devices 510 and 520 may use the security and connection information to send secure voice data to secure-media subsystem 560. Secure-media subsystem 560 may connect the secure-voice-communication session (i.e., transfer voice data between voice-communication devices 510 and 520) by performing port forwarding or other connection process.

As previously mentioned, the security information may include a session key. In such embodiments, voice-communication devices 510 and 520 may use the session key to encrypt and decrypt voice data transferred during the secure-voice-communication session. Encryption and decryption may be performed using any suitable encryption technology. For example, voice-communication device 510 and/or voice-communication device 520 may implement an Advanced Encryption Standard ("AES") in a modem chip. In other embodiments, voice-communication device 510 and/or voice-communication device 520 may include software for performing any suitable encryption algorithm.

FIG. 7 shows another process for establishing a secure-voice-communication session. Steps shown in FIG. 7 may be implemented in a variety of situations. For example, steps shown in FIG. 7 may be performed when one user (e.g., a user of voice-communication device 520) is unaware that another user (e.g., a user of voice-communication device 510) wants to start a secure-voice-communication session. Steps shown in FIG. 7 may also be performed upon expiration of a predetermined time period for waiting for a request from voice-communication device 520.

As shown in FIG. 7, voice-communication device 510 may initiate a secure registration process with secure-application subsystem 550 (step 720). For example, voice-communication device 510 may send a secure-voice-communication-session request to secure-application subsystem 550. The secure-voice-communication-session request may include an invitation for voice-communication device 520 to join the secure-voice-communication session. In some embodiments, the invitation may include a flag informing secure-application subsystem 550 that voice-communication device 520 should be prompted to send a secure-voice-communication-session request to secure-application subsystem 550. Secure-application subsystem 550 may hold the invitation for voice-communication device 520 (step 722) until voice-communication device 520 registers with secure-application subsystem 550.

Secure-application subsystem 550 may prompt voice-communication device 520 to send a secure-voice-communication request to join the secure-voice-communication session (step 724). Secure-application subsystem 550 may use one or more techniques to prompt voice-communication device 520 to send the request. For example, secure-application subsystem 550 may use a telephone number of voice-communication device 520 to communicate with voice-communication device 520. In some embodiments, the request from voice-communication device 510 may provide secure-application subsystem 550 with the telephone number of voice-communication device 520. In other embodiments, secure-application subsystem 550 may find the telephone number of voice-communication device 520 in a local or remote directory.

Secure-application subsystem 550 may use the telephone number of voice-communication device 520 to prompt voice-communication device 520 to contact secure-application subsystem 520. For example, secure-application subsystem 550 may send voice-communication device 520 a text message over base network 530. In other embodiments, secure-application subsystem 550 may call voice-communication device 520 over base network 530.

As mentioned, secure-application subsystem 550 may send a text message (e.g., a Short Message Service ("SMS") message) to voice-communication device 520. The text message may inform voice-communication device 520 and/or a user of voice-communication device 520 that a user of voice-communication device 510 wants to start a secure-voice-communication session. The text message may provide the user of voice-communication device 520 the name of the user of voice-communication device 510, the telephone number of voice-communication device 510, and/or any other information identifying the requestor of the secure-voice-communication session.

In some embodiments, the text message may provide voice-communication device 520 with information (e.g., an IP address) that may be used to send a secure-voice-communication-session request to secure-application subsystem 550. In other embodiments, voice-communication device 520 may already have information that may be used to send a secure-voice-communication-session request to secure-application subsystem 550.

Instead of or in addition to sending a text message, secure-application subsystem 550 may call voice-communication device 520 to prompt voice-communication device 520 and/or prompt a user of voice-communication device 520 to join the secure-voice-communication session. The call to voice-communication device 520 may include a message asking the user of voice-communication device 520 to join a secure-voice-communication session with the user of voice-communication device 510.

After receiving the prompt from secure-application subsystem 550, voice-communication device 520 may launch secure-communication module 522. For example, a call and/or text message sent to voice-communication device 520 from secure-application subsystem 550 may trigger voice-communication device 520 to launch secure-communication module 522. In other embodiments, the secure-communication module 522 may already be running on voice-communication device 520.

In some embodiments, voice-communication device 520 may identify an IP address of a text message and/or a telephone number of a communication from secure-application subsystem 550. In response to identifying a communication from secure-application subsystem 550, voice-communication device 520 may automatically launch secure-communication module 522 and/or send a request to secure-application subsystem 550.

Secure-communication module 522 may register with secure-application subsystem 550 (step 726). In some embodiments, secure-communication module 522 may automatically register with secure-application subsystem 550 in response to the prompt from secure-application subsystem 550. In other embodiments, secure-communication module 522 may register with secure-application subsystem 550 in response to a user's input requesting a secure-voice-communication session with voice-communication device 510.

In some embodiments, voice-communication device 520 may be behind a Network Address Translation ("NAT") device (e.g., a firewall, a Session Border Controller ("SBC"), a wireless Internet device, a broadband device, etc.). In such situations, the NAT device may not route network traffic from an outside device (i.e., a device outside the network behind the NAT) to voice-communication device 520 unless voice-communication device 520 initiated communication with the outside device. Secure-application subsystem 550 may still be able to find and authenticate voice-communication device 520 because voice-communication device 520, as discussed above, may respond to telephone calls or text messages sent over base network 530.

Voice-communication device 520 may use the secure-communication channel during the secure registration process with secure-application subsystem 550. After voice-communication device 520 registers with secure-application subsystem 550, secure-application subsystem 550 may ask secure-media subsystem 560 to provision resources for a new communication session (step 728). In response, secure-media subsystem 560 may send connection information to secure-application subsystem 550 (step 730).

Secure-application subsystem 550 may then send security and connection information to voice-communication devices 510 and 520 (steps 732 and 734). Voice-communication devices 510 and 520 may use the connection information to connect to secure-media subsystem 560, and secure-media subsystem 560 may connect the secure-voice-communication session between voice-communication devices 510 and 520 (step 736). For example, voice data sent from voice-communication device 510 to voice-communication device 520 may first be sent to secure-media subsystem 560 and may then be forwarded to voice-communication device 520. Similarly, voice data sent from voice-communication device 520 to voice-communication device 510 may first be sent to secure-media subsystem 560 and may then be forwarded to voice-communication device 510. Thus, secure-media subsystem 560 may function as a proxy for voice-communication devices 510 and 520.

FIG. 8 shows a voice-communication-session-termination process for terminating a secure-voice-communication session. Voice-communication device 510 may request to terminate the secure-voice-communication session (step 820). Secure-application subsystem 550 may then send a termination notification to voice-communication device 520 (step 822). Secure-application subsystem 550 may ask secure-media subsystem 560 to terminate the secure-voice-communication session (step 824). Secure-media subsystem 560 may process the voice-communication-session termination by releasing all resources allocated to the secure-voice-communication session (step 826). Secure-media subsystem 560 may clean up processes, clean up firewall rules, and/or release ports as part of terminating the secure-voice-communication session. Secure-application subsystem 550 may terminate registration with voice-communication devices 510 and 520 (steps 828 and 830). Each of voice-communication devices 510 and 520 may then notify base network 530 that they are available for calls (steps 832 and 834).

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

What is claimed is:

1. A method comprising:
receiving, from a first voice-communication device, a first request to establish a secure-voice-communication session with a second voice-communication device;
receiving, from the second voice-communication device, a second request to establish the secure-voice-communication session with the first voice-communication device;
establishing the secure-voice-communication session between the first and second voice-communication device;
holding the first request until the second request is received; and
after receiving the second request, determining that the second request is associated with the first request.

2. The method of claim 1, further comprising:
using a base network to handle at least one call-management task associated with the secure-voice-communication session, wherein unsecured-voice-communication sessions with the first voice-communication device are handled by the base network.

3. The method of claim 2, wherein using the base network to handle at least one call-management task associated with the secure-voice-communication session comprises using the base network to handle at least one setup task for the secure-voice-communication session.

4. The method of claim 2, wherein using the base network to handle at least one setup task comprises using the base network to handle at least one communication in a registration process for the first voice-communication device.

5. The method of claim 2, wherein:
the base network comprises a wireless network; and
using the base network to handle at least one call-management task comprises relying on the wireless network to handle at least one mobility-management task.

6. The method of claim 2, wherein using the base network to handle at least one call-management task comprises relying on the base network to manage presence information associated with the secure-voice-communication session.

7. The method of claim 1, further comprising terminating an unsecured-voice-communication session in response to the first request, wherein terminating the unsecured-voice-communication session and establishing the secure-voice-communication session are performed in a manner that is transparent to a user of the first voice-communication device.

8. A method comprising:
receiving, from a first voice-communication device, a first request to establish a secure-voice-communication session with a second voice-communication device;
receiving, from the second voice-communication device, a second request to establish the secure-voice-communication session with the first voice-communication device;
establishing the secure-voice-communication session between the first and second voice-communication devices;
using a base network to handle at least one call-management task associated with the secure-voice-communication session, wherein unsecured-voice-communication sessions with the first voice-communication device are handled by the base network;

wherein using the base network to handle at least one call-management task associated with the secure-voice-communication session comprises using the base network to handle at least one setup task for the secure-voice-communication session; and wherein using the base network to handle at least one setup task comprises using the base network to prompt the second voice-communication device to send the second request.

9. The method of claim 8, wherein using the base network to prompt the second voice-communication device to send the second request comprises sending a text message to the second voice-communication device over the base network.

10. The method of claim 8, wherein using the base network to prompt the second voice-communication device to send the second request comprises calling the second voice-communication device over the base network.

11. The method of claim 8, wherein using the base network to handle at least one setup task further comprises using the base network to handle at least one communication in a registration process for the first voice-communication device.

12. The method of claim 8, wherein:
the base network comprises a wireless network; and
using the base network to handle at least one call-management task further comprises relying on the wireless network to handle at least one mobility-management task.

13. The method of claim 8, wherein using the base network to handle at least one call-management task further comprises relying on the base network to manage presence information associated with the secure-voice-communication session.

14. The method of claim 8, wherein establishing the secure-voice-communication session between the first and second voice-communication devices comprises:
authenticating the first voice-communication device;
authenticating the second voice-communication device;
requesting that a secure-media subsystem provision resources for the secure-voice-communication session;
receiving, from the secure-media subsystem, connection information for the secure-voice-communication session; and
sending security information and the connection information to the first and second voice-communication devices.

15. The method of claim 8, further comprising terminating an unsecured-voice-communication session in response to the first request, wherein terminating the unsecured-voice-communication session and establishing the secure-voice-communication session are performed in a manner that is transparent to a user of the first voice-communication device.

16. The method of claim 8, wherein the base network comprises a circuit-switched communication network.

17. The method of claim 8, tangibly embodied as computer-executable instructions on at least one computer-readable medium.

18. A method comprising:
establishing an unsecured-voice-communication session over a base network;
during the unsecured-voice-communication session, receiving input that initiates a secure-voice-communication session;
terminating the unsecured-voice-communication session;
using the base network to handle at least one call-management task associated with the secure-voice-communication session; and
connecting to the secure-voice-communication session;
wherein using the base network to handle at least one call-management task comprises using the base network to send a secure-application subsystem a first request to establish the secure-voice-communication session; and
wherein the first request indicates that a second voice-communication device should be prompted to send the secure-application subsystem a second request to establish the voice-communication session with a first voice-communication device.

19. The method of claim 18, wherein using the base network to handle at least one call-management task further comprises using the base network to handle at least one of:
a mobility-management task;
a presence-management task;
a setup task; and
a call-control task.

20. A system comprising:
a secure-session-setup module installed on a secure-application subsystem and programmed to:
receive, from a first voice-communication device, a first request to establish a secure-voice-communication session with a second voice-communication device;
receive, from a second voice-communication device, a second request to establish the secure-voice-communication session with the first voice-communication device; and
establish the secure-voice-communication session between the first and second voice-communication devices; and
a first secure-communication module installed on the first voice-communication device and programmed to send the first request to the secure-application subsystem;
wherein the first request comprises a request to prompt the second voice-communication device to send the second request to the secure-application subsystem.

21. The system of claim 20, further comprising:
a second secure-communication module installed on the second voice-communication device;
wherein:
the secure-session-setup module is programmed to use a base network to send a communication to the second secure-communication module to prompt the second secure-communication module to send the second request; and
the second secure-communication module is programmed to respond to the communication by sending the second request to the secure-session-setup module.

22. The system of claim 20, wherein:
the first voice-communication device is configured to use a base network to handle at least one call-management task associated with the secure-voice-communication session; and
unsecured-voice-communication sessions with the first voice-communication device are handled by the base network.

23. A system comprising:
a secure-session-setup module installed on a secure-application subsystem and programmed to:
receive, from a first voice-communication device, a first request to establish a secure-voice-communication session with a second voice-communication device;
receive, from a second voice-communication device, a second request to establish the secure-voice-communication session with the first voice-communication device; and
establish the secure-voice-communication session between the first and second voice-communication devices; and a secure-media subsystem communicatively coupled to the secure-session-setup module;

wherein:

the secure-session-setup module is programmed to send the secure-media subsystem a request to provision resources for the secure-voice-communication session;

the secure-media subsystem is programmed to respond to the request to provision resources by sending Internet Protocol addresses and ports for the secure-voice-communication session to the secure-session-setup module;

the secure-session-setup module is programmed to send the Internet Protocol addresses and ports for the secure-voice-communication session to the first and second voice-communication devices;

the secure-session-setup module is programmed to create a session key and to send the session key to the first and second voice-communication devices; and the second voice-communication device is programmed to communicate with the first voice-communication device through the secure-media subsystem.

24. The system of claim 23, wherein the first voice-communication device is programmed to:

communicate with the second voice-communication device using a secure transport protocol;

receive encrypted voice data from the second voice-communication device; and decrypt the encrypted voice data.

25. A system comprising:

a secure-session-setup module installed on a secure-application subsystem and programmed to:

receive, from a first voice-communication device, a first request to establish a secure-voice-communication session with a second voice-communication device;

receive, from a second voice-communication device, a second request to establish the secure-voice-communication session with the first voice-communication device;

establish the secure-voice-communication session between the first and second voice-communication devices;

hold the first request until the second request is received; and after receiving the second request, determine that the second request is associated with the first request.

* * * * *